United States Patent Office 3,271,326
Patented Sept. 6, 1966

3,271,326
FLAME SPRAYING OF CATALYTICALLY ACTIVE PULVERIZED METAL OXIDES ON SUPPORTS
Albert J. Forney, Coraopolis, and Joseph J. Demeter, Charleroi, Pa., assignors to the United States of America as represented by the Secretary of the Interior
No Drawing. Filed July 22, 1963, Ser. No. 296,870
3 Claims. (Cl. 252—466)

The invention herein described and claimed may be manufactured and used by or for the Government of the United States of America for governmental purposes without the payment of royalties thereon or therefor.

This invention relates to improvements in the catalytic hydrogenation of carbon monoxide.

Conventional hydrogenation catalysts such as Raney nickel are usually brittle and are difficult to machine or fabricate. They are, therefore, usually used in the powdered or granular form. When the granular material is used in a fixed-bed reactor the pressure drop through the bed is high and heat transfer is relatively poor. To minimize these disadvantages complex and costly reactors often must be employed for use of such catalysts.

It is therefore the object of the present invention to provide a convenient and economical means for preparing a catalyst that is highly efficient in the hydrogenation of carbon monoxide to produce hydrocarbon fuels.

It has now been found that this objective may be achieved by a process in which an oxide of a catalytic metal, such as nickel, is flame sprayed on a suitable support, followed by reduction of the metal oxide to form a porous coating of catalytic metal on the support.

The support material may be metallic or nonmetallic and may be in any desired shape or form. Examples of inert support materials are steel, copper, aluminum, brass, activated alumina, carbon and silicon carbide. A particularly advantageous support has been found to be steel shapes such as rods, plates, screens, cylinders, tubes, etc. These supports, provided with a thin coating of catalyst, enable operation of a catalytic reactor with greatly improved heat transfer, pressure drop characteristics (as much as 90% reduction) and available surface area of the catalyst. The utilization of a thin catalyst coating is especially advantageous when Raney nickel or even more expensive catalysts are used.

Coating of the support material is accomplished by means of a thermo spray gun utilizing metal oxide powder (about 100–300 mesh) as the spray material. Any equipment that could develop a sufficiently high temperature could be used to spray the metal oxide on the support. The support is preferably cleaned and subsequently grit- or shot-blasted to roughen the surface prior to spraying. Optimum thickness of the coating will vary depending on the composition of the catalyst, composition and shape of the support mtaerial, reaction to be catalyzed, etc., and is best determined experimentally. A thickness of about 0.005 to 0.060 inch has been found to be very satisfactory when using steel plates as the support material.

Reduction of the oxide coating may be accomplished by a conventional reducing gas such as hydrogen or carbon monoxide. Reaction conditions for the reduction process will also vary according to the nature of the catalytic metal, size and shape of support etc. Generally the reduction is accomplished by passing hydrogen through the reactor prior to introduction of the synthesis gas comprising carbon monoxide and hydrogen. The temperature employed in reduction is usually from about 300° C. to 500° C. The volume of reducing gas and time of treatment will of course depend on the amount of catalyst and its physical arrangement. Space velocity of the reducing gas is generally about 100 to 2000 vol./vol./hr. (volumes of gas per volume of catalyst per hour).

The reaction conditions, i.e., proportions, temperature, pressure, etc., used in reaction of carbon monoxide and hydrogen according to the process of the invention are substantially those which are conventionally used in this reaction. Changes in reaction conditions, if any, necessitated by the use of the novel catalysts of the invention will be readily determined empirically by one skilled in the art. Conventional reaction temperatures are from about 200° C. to about 500° C. Pressures of about atmospheric to about 400 p.s.i.g. are generally employed. Proportions of reactants in the synthesis gas generally range from about 1.0 to 3.0 moles of hydrogen per mole of carbon monoxide with a space velocity of about 500 to 7000 vol./vol./hr.

The following example will serve to more particularly describe the invention.

Example

In this example plates of stainless steel and aluminum were sprayed with nickel oxide having the following composition:

| | Percent |
|---|---|
| Nickel | 74.20 |
| Cobalt | 1.04 |
| Iron | 1.94 |
| Copper | 0.73 |
| Sulfur | 0.13 |

Oxygen, balance (approx. 22%).

This material was ground and sieved to between 100–300 mesh using Tyler standard screens. Fifteen plates 5¾ in. long, 1/32 in. thick, with widths varying between 2⅞ and 1¼ inches were assembled after spraying into a section of circular cross section to fit into a 3-inch diameter reactor. The smaller plates were on the outside of the section, and the largest ones in the middle, in parallel array. The plates prior to assembly were cleaned, shot-blasted to roughen the surface, then sprayed using a Metco thermo spray gun type P with an oxy-acetylene flame. Approximate temperature of operation was 3500°–4000° F. The plates were sprayed to make a coating thickness of about 0.030 inch on the sides and edges of each plate. Three sections of sprayed stainless steel plates and one section of sprayed aluminum plates were then charged to the reactor of a hot gas recycle pilot plant. The catalyst bed height was 2 feet, and the catalyst volume was 0.092 cu. feet. The catalyst was reduced using 100 std. cu. ft./hr. of hydrogen at 400° C. and a space velocity of 1100 vol./vol./hr. for about 40 hours. Using a synthesis gas of $3H_2+1CO$ composition at a space velocity of 3000 volumes of gas for each volume of catalyst, operating at an average reactor temperature of 393° C., 95.4 percent conversion of the feed gas was achieved. The product gas had a gross heating value of 856 B.t.u./s.c.f., and had the following composition: $H_2$, 13.4; $CO$, 1.7; $N_2$, 1.2; $CO_2$, 3.3; and $CH_4$, 79.3 percent.

The process of the invention is not limited to the nickel catalyst of the above example but is also applicable to other conventional catalysts such as iron, cobalt, tungsten, silver, vanadium, molybdenum, chromium, manganese, etc.

It will be apparent from the above description that applicants' invention permits more efficient and varied use of synthesis catalysts by making them available in many shapes and forms to attain low pressure drop, high heat transfer from the catalyst surface and simplified reactor design. The porous nature of the catalysts of the invention also results in high catalyst utilization (large exposed surface per unit weight).

The process of the invention is also readily adaptable for use in a tube-wall reactor for methane synthesis. The oxide is flame-sprayed on the outside of the steel tube of the reactor and reduced with hydrogen. Coolant liquid on the inside of the tube affords excellent temperature control of the highly exothermic methanation reaction due to efficient heat transfer from the catalytic metal surface to the coolant liquid. The arrangement may, of course, be reversed with the catalyst inside the tube and coolant liquid outside.

The catalysts of the invention may also be further treated by conventional means such as acid, alkali or other chemical treatment to further enhance or restore catalytic activity, if desired. The effectiveness of such treatments will, of course, vary with the particular catalyst and reaction conditions under which it is to be used.

The process of the invention may also be modified by flame spraying a coating of conventional carrier or activating material such as activated alumina or zirconia onto the support and subsequently spraying the coating of catalytic metal oxide onto the resulting support structure. It may also be desirable to treat the carrier material ($Al_2O_3$ or $ZrO_2$) with acid, alkali or other agent prior to addition of the catalytic metal oxide.

What is claimed is:

1. A process for producing a catalytic structure composed of a coating of a catalytically-active elemental metal on an inert support material, the metal being selected from the group consisting of nickel, iron, cobalt, molybdenum, tungsten, silver, vanadium, chromium and manganese, comprising
   (a) flame spraying a feed material composed of a powdered oxide of said metal onto said support to form an oxide coating thereon;
   (b) contacting said coating with a reducing gas to remove the oxygen therefrom and form pores in the coating thereby forming said catalytically-active coating on said support.
2. The process of claim 1 wherein said metal is nickel.
3. The process of claim 2 wherein said support material is selected from the group consisting of stainless steel plates and aluminum plates.

References Cited by the Examiner

UNITED STATES PATENTS

| | | | |
|---|---|---|---|
| 2,521,538 | 9/1950 | Rees | 23—288 XR |
| 2,526,657 | 10/1950 | Guyer | 23—288 |
| 2,702,814 | 2/1955 | Riblett et al. | 260—449.6 |
| 3,125,539 | 3/1964 | Teague | 252—466 XR |
| 3,155,627 | 11/1964 | Cole et al. | 252—477 |

MORRIS O. WOLK, *Primary Examiner.*

JOSEPH SCOVRONEK, *Assistant Examiner.*